United States Patent
Delsuc et al.

(10) Patent No.: US 11,985,229 B2
(45) Date of Patent: May 14, 2024

(54) METHOD, FIRST DEVICE, FIRST SERVER, SECOND SERVER AND SYSTEM FOR ACCESSING A PRIVATE KEY

(71) Applicant: THALES DIS FRANCE SAS, Meudon (FR)

(72) Inventors: Julien Delsuc, La Ciotat (FR); Pascal Leroy, La Ciotat (FR)

(73) Assignee: THALES DIS FRANCE SAS, Meudon (FR)

( * ) Notice: Subject to any disclaimer, the term of this patent is extended or adjusted under 35 U.S.C. 154(b) by 304 days.

(21) Appl. No.: 17/619,318

(22) PCT Filed: Jun. 29, 2020

(86) PCT No.: PCT/EP2020/068261
§ 371 (c)(1),
(2) Date: Dec. 15, 2021

(87) PCT Pub. No.: WO2021/004825
PCT Pub. Date: Jan. 14, 2021

(65) Prior Publication Data
US 2022/0231841 A1 Jul. 21, 2022

(30) Foreign Application Priority Data
Jul. 9, 2019 (EP) .................................. 19305927

(51) Int. Cl.
*H04L 9/08* (2006.01)
*H04L 9/32* (2006.01)

(52) U.S. Cl.
CPC .......... *H04L 9/0825* (2013.01); *H04L 9/0861* (2013.01); *H04L 9/3213* (2013.01); *H04L 9/3247* (2013.01); *H04L 9/3271* (2013.01)

(58) Field of Classification Search
CPC ... H04L 9/0825; H04L 9/0861; H04L 9/3213; H04L 9/3247; H04L 9/3271; H04L 9/3239; H04L 9/50; H04L 63/0853
See application file for complete search history.

(56) References Cited

U.S. PATENT DOCUMENTS

| | | | |
|---|---|---|---|
| 10,341,117 B2 * | 7/2019 | Sharma | H04L 9/3247 |
| 2014/0351589 A1 * | 11/2014 | Chenna | H04W 12/068 713/168 |
| 2019/0036932 A1 * | 1/2019 | Bathen | H04L 63/0428 |

FOREIGN PATENT DOCUMENTS

WO   WO2019020616 A1   1/2019

OTHER PUBLICATIONS

International Search Report (PCT/ISA/210) and Written Opinion (PCT/ISA/237) dated Jul. 20, 2020, by the European Patent Office as the International Searching Authority for International Application No. PCT/EP2020/068261 (WO2021/004825)—[13 pages].

* cited by examiner

*Primary Examiner* — Abiy Getachew

(57) ABSTRACT

A method for accessing a private key is provided. The method includes storing, by a first device, the private key and an associated public key, generating an access token, sending to a second device, the access token, sending, to a first server, an address relating to a decentralized identifier and the access token, sending, by the first server, to a ledger, a request for getting a decentralized identifier along with the decentralized identifier address. By way of the method a solution is provided for accessing, by a first server to be accessed from a second device, based on a decentralized identifier readable from a ledger, a second server, as a proxy to a first device. It allows for authenticating a first device to a first server while keeping the private key only at the first device side (and not at the second device side).

9 Claims, 2 Drawing Sheets

METHOD, FIRST DEVICE, FIRST SERVER, SECOND SERVER AND SYSTEM FOR ACCESSING A PRIVATE KEY

BACKGROUND

Field

The invention relates generally to a method for accessing a private key.

Furthermore, the invention also pertains to a first device for accessing a private key.

Moreover, the invention also concerns a first and a second server for accessing a private key.

Finally, the invention relates to a system for accessing a private key as well. The system includes a first device, a second device, a first server and a second server. The second device may include a mobile (tele)phone, a laptop, a Personal Computer (or PC) or any other device including preferably a secured memory(ies).

INTRODUCTION

U.S. Pat. No. 9,053,313 B2 describes a solution that includes, at a server side, a secure key store that records user private keys that allow, each, to access a Public Key Infrastructure (or PKI) service, such as a decryption or signature operation that uses the user private key, when a user's smart card is not available.

It is also known to access a centralized server that stores a plurality of user private keys.

However, the centralized server has to disclose, for each user private key, user data, such as user credentials, so as to select the private key to be used.

Furthermore, when the centralized server has been successfully attacked, a malicious application or an attacker accesses all of the user private keys since the user private keys are stored at the centralized server, as one and the same entity.

Moreover, a user of a private key may desire to keep his/her private key without disclosing neither user data nor the private key to any other entity.

There is a need to provide a solution that allows access to a private key while protecting/securing the user privacy.

SUMMARY

A solution is provided for satisfying the just herein above specified need by providing a method for accessing a private key owned by a user or an entity.

In this arrangement, the method comprises:
a) storing, by a first device, the private key and an associated public key;
b) generating, by the first device, an access token;
c) sending, by the first device, to a second device, the access token;
d) sending, by the second device, to a first server, an address relating to a decentralized identifier and the access token;
e) sending, by the first server, to a ledger, a request for getting a decentralized identifier along with the decentralized identifier address;
f) sending, by the ledger, to the first server, the decentralized identifier, the decentralized identifier including the public key;
g) generating, by the first server, a challenge;
h) encrypting, by the first server, the challenge using the public key;
i) sending, by the first server, through a second server, to the first device, the encrypted challenge and the access token, an address relating to the second server being identified by using the decentralized identifier;
j) verifying, by the first device, whether the received access token is or is not the generated access token;
k) decrypting, by the first device, only if the received access token is the generated access token, the encrypted challenge using the private key;
l) sending, by the first device, directly or through the second server, to the first server, the challenge;
m) verifying, by the first server, whether the received challenge is or is not the generated challenge; and
n) attesting, by the first server, only if the received challenge is the generated challenge, that the decentralized identifier includes data that belongs to a user or an entity.

One principle is firstly to register a key pair with a private key and an associated public key and generate an access token, at a first device side, and to send to a second device the access token. Then, the second device transmits, to a first server, the access token and an address relating to a Decentralized IDentifier (or DID). The first server requests to a ledger, such as e.g., a BlockChain (or BC), a DID along with the DID address. The ledger transmits to the first server the DID including the public key that is associated with the first device registering the private key. The first server generates a challenge that the first server then encrypts using the public key. The first server identifies, based on the DID, a second server address. The first server sends, through the second server, to the first device, the encrypted challenge and the access token. The first device checks whether the received access token is or is not the generated access token. In the positive case, the first device decrypts, by using the private key, the encrypted challenge and obtains the challenge, i.e. a non-encrypted challenge. Then, the first device transmits, directly or indirectly through the second server, to the first server, the (resulting) challenge in plain text. The first server checks whether the received challenge is or is not the generated challenge. In the affirmative, the first server ascertains that the DID includes data that is possessed by a user or an entity.

The first server outputs the received access token along with a challenge encrypted by using the public key and relayed, in an encrypted manner, by the second server, to the first device, so as to be input back to the first server, in an unencrypted manner (or in plain text), when the access token is successfully verified by the first device. The used public key is the one that is associated with the first device private key. Once the challenge is successfully verified by the first server, the first server authorizes access through or to the first server.

The first server thus authenticates the first device when at least two conditions are satisfied, namely the access token has been fed back, from the first server, through the second server, to the first device and is successfully verified by the first device and the encrypted challenge has been fed back, in a decrypted manner, from the first device to the first server.

It is to be noted that the second device exchanges with the first device by using any type of communication technology, be it wired, wireless or ContacT-Less (or CTL).

The second device is unable to access successfully the first server if the first device is not involved to verify the issued access token and decrypt an encrypted challenge sent from the first server.

Only when the second device is connected to the first device, the first device is able to receive an issued access token to be verified by the first device and an encrypted challenge to be decrypted by the first device.

The second device may be situated in a close or distant location with respect to a location occupied by the first device provided that the second device is connected to the first device. The user/entity may carry and use the second device that may be mobile, i.e. the second device moves away or toward the first device. The user/entity does not need to carry the first device that may be static, i.e. remains situated in a fixed place, such as e.g., a user home or an entity premise.

Except for accessing the first server to be identified or selected from the second device, the user/entity does not need to be involved, so as to access securely the first server.

The provided solution is convenient to use since the user/entity may be slightly involved while authenticating securely (protecting the user/entity data) the user/entity.

The first server may identify, through a decentralized identifier, from a ledger, the second server to be addressed and does not need to know the first device.

The decentralized identifier is known per se and notably described on the site https://w3c-ccg.github.io/did-spec/. The decentralized identifier is a self-sovereign digital identity that is independent from a centralized entity, identity provider or certificate authority, while remaining under control of the decentralized identifier subject and verifiable.

Contrary to the aforementioned known solution, the inventive first device, as a private key holder, does not need to disclose neither any user data, like e.g., user credentials, nor any private key, so as to access securely the first server.

The inventive solution allows accessing, by a first server to be accessed from a second device, based on a decentralized identifier readable from a ledger, a second server, as a proxy to a first device. The second server solely accesses the first device. Such a use of a decentralized identifier allows not to need to involve the user (except for his/her possible authentication) and allows not to need to reveal to the first server any identifier relating to the first device which remains thus unknown to the first server.

The inventive solution allows authenticating a first device to a first server while keeping the private key only at the first device side (and not at the second device side). The private key does not need to be duplicated, i.e. copied to another entity, such as e.g., a cloud server, that is separate from the first device.

The inventive solution allows the concerned user/entity not to lose his/her private key since the first device, as a secure personal entity, that stores the private key that is accessible from a second device that may be different from one to another private key access session.

The inventive solution allows the concerned user/an entity to control access to a first server by authorising only a second device connected to the first device connected mainly to a second server. A connection or a non-connection of the second device to the first server allows authorising or prohibiting respectively access to the first server.

The inventive solution also allows protecting the user privacy since no user data, like e.g., user credentials, that is stored within the first device and/or the second device, needs to be revealed, i.e. exported during a request for connecting to the first server.

Moreover, the inventive solution allows the user/entity to keep control on the user/entity data, so as to access, after a successful first device authentication by the first server, one or several services provided by or through the first server.

According to a further aspect, the solution includes a first server for accessing a private key.

The first server is configured to:
receive, from a second device, an address relating to a decentralized identifier and an access token;
send, to a ledger, a request for getting a decentralized identifier along with the decentralized identifier address;
receive, from the ledger, the decentralized identifier, the decentralized identifier including the public key;
generate a challenge;
encrypt the challenge using the public key;
send, through a second server, to a first device, the encrypted challenge and the access token, an address relating to the second server being identified by using the decentralized identifier;
receive, from the first device, directly or through the second server, the challenge;
verify whether the received challenge is or is not the generated challenge; and
attest, only if the received challenge is the generated challenge, that the decentralized identifier includes data that belongs to a user or an entity.

According to still a further aspect, a second server for accessing a private key is provided.

In this arrangement, the second server is configured to:
receive, from a first server, an encrypted challenge and an access token; and
send, to a first device, the encrypted challenge and the access token.

According to still a further aspect, the solution includes a first device for accessing a private key.

In this arrangement, the first device is configured to:
store the private key and an associated public key;
generate an access token;
send, to a second device, the access token;
receive, from a second server, an encrypted challenge and the access token;
verify, whether the received access token is or is not the generated access token;
decrypt, only if the received access token is the generated access token, the encrypted challenge using the private key; and
send, directly or through the second server, to a first server, the challenge.

The first device may include a Set-Top Box (or STB), a Network Access Point (or NAP), a PC, a dongle, like e.g., a Universal Serial Bus (or USB) type dongle or a CTL type dongle, such as e.g., a BluetooTH (or BTH) type dongle.

Within the present description, a dongle is a smart object that is intended to communicate with the outside world.

As dongle, it may include a USB type dongle, a smart card, as removable dongle, to be coupled to a PC or a NAP, or a chip intended to be fixed, possibly in a removable manner, to a PC or a NAP, as a chip hosting device.

The first device may include any device connected directly or indirectly, i.e. through one or several intermediary entities, to a second server.

According to still a further aspect, the solution includes a system for accessing a private key.

In this arrangement, the system includes a first device, a second device, a first server and a second server. The first device is configured to:
- store the private key and an associated public key;
- generate an access token; and
- send, to a second device, the access token.

The second device is configured to send, to a first server, an address relating to a decentralized identifier and the access token.

The first server is configured to send, to a ledger, a request for getting a decentralized identifier along with the decentralized identifier address.

The ledger is configured to send, to the first server, the decentralized identifier, the decentralized identifier including the public key.

The first server is configured to:
- generate a challenge;
- encrypt the challenge using the public key; and
- send, through a second server, to the first device, the encrypted challenge and the access token, an address relating to the second server being identified by using the decentralized identifier.

The first device is configured to:
- verify whether the received access token is or is not the generated access token;
- decrypt, only if the received access token is the generated access token, the encrypted challenge using the private key; and
- send, directly or through the second server, to the first server, the challenge.

And the first server is configured to:
- verify whether the received challenge is or is not the generated challenge; and
- attest, only if the received challenge is the generated challenge, that the decentralized identifier includes data that belongs to a user or an entity.

As second device, it may include any device that is able to be connected to the first server and the second server.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Herein under is considered a case in which the invention method for accessing a private key owned by a user or an entity is implemented by a CTL type dongle, as a first device, a phone, as a second device, a first and a second server. The dongle is coupled to a PC, as a dongle hosting device, that is connected to one or several (communication) networks that include or are connected to the first and second servers.

According to another embodiment, instead of cooperating with a dongle, a PC (or the like), as a stand-alone entity and first device, carries out the functions that are carried out by the CTL dongle and that are described infra.

Naturally, the herein below described embodiment is only for exemplifying purposes and is not considered to reduce the scope of the invention.

For example, instead of being a CTL type dongle, the dongle may be a ContacT (or CT) dongle, such as a USB type dongle, a smart card or any other electronic medium that may have different form factors while including a chip(s).

According to another example, the dongle consists of a chip(s) that is(are) soldered or fixed, possibly in a removable manner, to a PC, as an hosting device.

Figure 1:
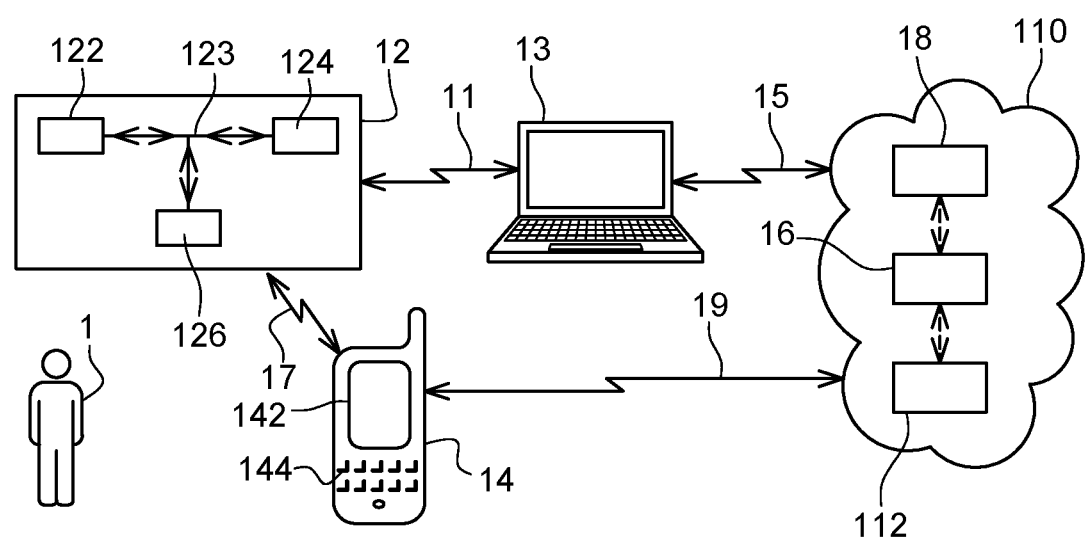
FIG. 1 illustrates a simplified diagram of one embodiment of a system for accessing a private key, including a CTL type dongle, a mobile phone, a first and a second server, the phone being paired with the dongle, the dongle being configured to register the private key, issue an Access Token (or AT), through the phone, receive, from the second server, an encrypted challenge and the AT, check whether the received AT is the issued AT, and, if yes, send to the second server the challenge, according to the invention.

FIG. 1 shows schematically a system 10 for accessing a private key.

Such a system 10 includes a CTL type dongle 12, a PC 13, a mobile phone 14, a first server 16 and a second server 18.

For sake of simplicity, the CTL type dongle 12 and the mobile phone 14, are termed hereinafter the dongle 12 and the phone 14 respectively.

A user 1 desires accessing one or several services. The considered services are provided by or through the first server 16. The services may be e.g., a payment of a product(s) and/or a service(s), or of any type.

The user 1 (or an entity) owns the dongle 12, as a (user) personal and first device.

The dongle 12 may be located in an individual's house, a factory, a company premise or any other location. The dongle 12 may be in a distant location with respect to a first server 16 location.

It is to be noted that only one first device, is represented for clarity reason. However, the server side may be connected, through one or several (communication) networks (not represented), to a plurality (or fleet) of first devices. The network(s) may include a mobile radio-communication network(s) and/or an Internet type network.

Instead of a dongle, as first device, the first device may consist of a mobile phone, a PC, a STB, a smart TeleVision (or TV), a game console, or any electronic device including one or several (micro)processor(s), as data processing means, one or several memories, as data storing means, and one or several Input/Output (or I/O) interfaces.

The dongle 12 is connected, through a CTL link(s) 11, to the PC 13.

Within the present description, the adjective "CTL" denotes notably that the communication means communicates via one or several Short Range (or SR) type RF links.

The SR type RF link(s) may be related to any CTL technology that allows the dongle 12 to exchange locally data, through a CTL link(s), with a local device(s), such as the PC 13 and the phone 14, and/or, possibly via a NAP, with the second server 18.

The SR RF(s) may be related to e.g., a Near Field Communication (or NFC), a Wi-Fi, a ZigBee, a BTH, a Bluetooth Low Energy (or) BLE type communication technology(ies) and/or the like.

Such an SR RF link(s) is(are) used for exchanging between the dongle 12 and the PC 13 and/or the phone 14 data at a short range distance. The short range distance is typically from around 20 cm (such as with an NFC type technology) until around 800 m (such as with a BTH type technology).

The dongle 12 may be adapted to operate only when a device, like e.g., a PC 13, that has been previously paired with the dongle 12 and connected directly or indirectly, i.e. over an intermediary entity(ies) coupled or connected to the device, to one or several networks. Such a pairing of the PC 13 and the dongle 12 and a connection of the PC 13 to the network(s) constitute preliminary conditions to be satisfied.

The dongle 12 is preferably adapted to operate only when a second device, like e.g., the phone 14, that has been previously paired with the dongle 12 and connected to one or several networks. Such a pairing between the phone 14 and the dongle 12 and a connection of the phone 14 to the network(s) constitute preliminary conditions to be satisfied.

The dongle 12 includes a chip(s) (not represented). The or each dongle chip includes one or several (micro)processors (or processors) (and/or a (micro)controller(s)) 122, as data processing means, one or several memories 124, as data storing means, and one or several I/O interfaces 126 that are internally all connected, through an internal bidirectional data bus 123, to each other.

The dongle 12 memory(ies) stores an Operating System(s) (or OS) and an invention application.

The dongle I/O interfaces 126 allow communicating data from the internal chip components to the outside of the chip and conversely. The dongle I/O interfaces 126 allow exchanging data, on one hand, with the PC 13, as a dongle hosting device, and on the other hand, with the phone 14, as a second device. The dongle I/O interfaces 126 allow the dongle 12 to pair with one or several devices, like e.g., one or several terminals and/or one or several user devices, such as e.g., the PC 13 and the phone 14, by exchanging data.

The dongle processor 122 processes, controls and communicates internally data, with all the other components incorporated in the chip and, through the I/O interfaces 126, with the chip exterior.

The dongle processor 122 executes or runs several applications including the invention application.

The dongle processor 122 runs preferably an application for generating one or several (cryptographic) private Keys (or pK), as a secret key(s), and, for each private key, an associated Public Key (or PK), as a key pair. Each key pair is preferably associated with a hash, like e.g., a RaNDom (or RND), that is pre-generated or generated on-the-fly by the dongle 12.

The dongle processor 122 carries out or performs preferably security functions, in order to protect access to data, such as e.g., a pK1, stored and managed by the dongle 12. The dongle 12 plays, among others, a role of a safe for the pK1 that is managed by the dongle 12.

The security functions include preferentially an encryption/decryption process to be used prior to sending data to/after receiving data from outside, so as to protect access to the private key(s). To encrypt data to be sent, the dongle 12 uses a predefined encryption key and a predetermined encryption algorithm, such as e.g., an Advanced Encryption Standard (or AES) or a Data Encryption Standard (or DES) or, that are both stored by the dongle 12. To decrypt data to be received, the dongle 12 uses a predefined decryption key and a predetermined decryption algorithm, such as an AES, a DES or the like, that are both stored in the dongle 12. The decryption algorithm is preferably the inverse algorithm of the encryption algorithm that is used at an emitter side, like e.g., the second server 18 and/or the phone 14.

The security functions include preferably a user authentication process. The user authentication process may be used prior to decrypting an encrypted challenge to be decrypted by the dongle 12. To authenticate the user, the dongle 12 supports preferably an application for verifying user authentication data by using predetermined reference user authentication data stored securely in the dongle 12. The dongle 12 compares input data to the stored reference user authentication data and authorizes, only when successful, a further prosecution, like e.g., a running of an application for decrypting an encrypted challenge to be received from the server side.

The dongle processor 122 is preferably able to initiate actions, in order to interact directly with the outside world, in an independent manner of its hosting device, such as e.g., the PC 13. Such a capacity of interaction at the initiative of the dongle 12 is also known as a proactive capacity. The dongle 12 is thus able to send data, at its own initiative, through its hosting device, to any device, such as e.g., a server, connected to the PC 13. For instance, the dongle 12 sends to the PC 13, a proactive command for sending either a command to the second server 18, like e.g., a query(ies) or a request(s) for knowing whether data has been received by the second server 18 and is addressed or intended to the dongle 12, or data, like e.g., a challenge (after its receipt in an encrypted manner and its internal decryption), to the sender of the data received by the second server 18 for the dongle 12.

The dongle 12 stores, preferably in a secure manner, in its memory(ies) 124, data for identifying the dongle 12, such as e.g., an Integrated Circuit Card IDentifier (or ICCID) or a Unique Universal ID (or UUID), as a dongle IDentifier(s) (or ID). The dongle ID(s) may be used for identifying the user 1.

The dongle 12 stores in its memory(ies) 124 an Internet Protocol (or IP) address relating to the dongle 12, a Uniform Resource Identifier (or URI) and/or a Uniform Resource Locator (or URL) relating to the dongle 12.

The dongle 12 may store securely data relating to the concerned user 1, as (personal) user data. The user data may include user credentials, like e.g., a bank account number, a first name, a last name, a birth date and/or other data.

The user 1 requests locally, e.g., through the PC 13 or the phone 14 that cooperates with the dongle 12 that is connected or coupled hereto, to pair the dongle 12 with e.g., the PC 13 or the phone 14 respectively.

The dongle 12 is arranged to generate an Access Token 1 (or AT1).

To do this, the dongle 12 may generate firstly a hash, like e.g., an RND1, as H1. Then, the dongle 12 uses a symmetric encryption algorithm, such as an AES or a DES, and a generic symmetric key such as e.g., an RND2, that is associated with either the dongle 12 for all the ATs to be generated, so as to generate the AT1, as a corresponding encryption result. Alternately, i.e. instead of using a single generic symmetric key for all the ATs to be generated, the dongle 12 uses a specific symmetric key that is generated on-the-fly and is associated with each AT to be generated, so as to generate the AT1, as a corresponding encryption result.

Then, the AT1 is the result of the encryption of H1 (that may be previously salted (i.e. with random data)) with either a generic or a specific symmetric key or the result of the encryption of H1 along with associated data, as inputs, with either a generic or a specific symmetric key. In other words, the AT1 is the encrypted H1.

The dongle 12 stores the H1 and either the generic symmetric key that is generated once for all the ATs or the specific symmetric keys that are, each, generated on-the-fly, for each AT to be generated.

The dongle 12 may further store data associated with the H1.

The associated data may include predefined reference user authentication data, a predefined second device identifier, like e.g., an IMSI, a predefined time stamp, a predefined validity time period, predefined reference user biometric data and/or other data.

If the dongle 12 does not store data associated with the H1, then the dongle 12 may store the AT1 that results from the encryption of the H1 along with data associated hereto.

The AT1 may be ephemeral, temporary or permanent.

The dongle 12 may use the H1 that is combined with, e.g., concatenated with, the H1 that is preferably encrypted by using a predefined encryption/decryption key (or Ked), as a symmetric key that is only stored in the dongle 12. The Ked may be generated on-the-fly, i.e. at the time the AT1 is generated. The Ked may be unique per first device (or common to a set of first devices). The Ked is known only to the dongle 12, so as to protect access to sensitive data, such as e.g., reference user authentication data. The thus generated AT1 is only verifiable by the dongle 12 that owns the Ked, as symmetric key to decrypt the generated AT1.

The dongle 12 may also associate the H1 with a predefined time stamp, a predefined validity time period, such as e.g., from around a few seconds to a few years, so as to define a time limit or a date at which the dongle 12 has to receive the AT1 while remaining valid.

The AT1 may include a predefined (or pre-computed) date until which the AT1 is valid to access the private key(s). The time stamp plus the validity time period equals to the desired time limit or date by which the AT1 has to be received by the dongle 12 from the server side.

The dongle 12 may also associate the H1 with a predefined ID, such as e.g., an identifier relating to a second device, like e.g., an International Mobile Subscriber Identity (or IMSI). The second device identifier identifies the second device that is used by the user 1 (or the entity), such as e.g., the phone 14, which the dongle 12 has to cooperate with, in order to verify that only the second device is allowed to use the AT1. The user 1 controls access to the concerned pK1 registered by the dongle 12 to access the desired service(s) with the AT1. The second device ID may be thus used to limit the use of the AT1 to the thus identified second device, as a first addressee of the AT1, for the concerned authentication session, so as to enhance the security level. Thus, if the AT1 is stolen, then the second device ID must also be stolen and used.

The dongle 12 may also associate the H1 with the reference user authentication data, such as a reference Personal Identity Number (or PIN) and/or reference biometric data, like e.g., a user 1 reference fingerprint(s).

The dongle 12 may use the H1 that is thus concatenated with the H1, possibly associated with a predefined time stamp, a predefined validity time period, a second device ID and/or the reference user authentication data, that are also, each individually, encrypted by using the Ked, so as to protect access to the concerned data associated with the H1.

Once the AT1 is generated, the dongle 12 is arranged to send to the phone 14, as the second device, the AT1. The AT1 is used for authenticating a server that is requested to be accessed, that has to send back (to the dongle 12) the AT1.

The dongle 12 is configured to receive, from a second server 18, the AT1 and an encrypted challenge.

The dongle 12 is preferably adapted to check whether received provided user authentication data does or does not match the reference user authentication data, so as to authenticate or not the user 1 respectively.

To authenticate the user 1, the dongle 12 may receive, from the user 1, e.g., through the second device and the first and second servers, besides the AT1 and the encrypted challenge, provided user authentication data, such as e.g., a provided PIN and/or a provided user 1 fingerprint(s). The dongle 12 is preferably arranged to compare the provided user authentication data to predetermined (i.e. the registered) reference user authentication data. If the provided user authentication data does not match the reference user authentication data, then the dongle 12 fails to authenticate the user 1 and terminates an execution of the launched private key access process. Otherwise, i.e. if the provided user authentication data matches the reference user authentication data, the dongle 12 succeeds in authenticating the user 1, i.e. the dongle 12 ascertains that the provided user authentication data matches the reference user authentication data and continues the execution of the launched private key access process.

The dongle 12 is adapted to check whether the received AT is or is not the generated AT1. If the received AT is not the generated AT1, i.e. the received AT is not valid, then the dongle 12 fails to authenticate the original sender of the AT, namely a server requested to be accessed, and terminates an execution of the launched private key access process. Otherwise, i.e. if the received AT is the generated AT1, i.e. if the received AT is valid, the dongle 12 authenticates successfully the original sender of the AT, namely a server requested to be accessed, and continues the execution of the launched private key access process.

The dongle 12 is configured to unlock, only if the received AT is the generated AT1 and optionally if the provided user authentication data matches the reference user authentication data, access to the pK1.

The dongle 12 is adapted to decrypt, only if the received AT is the generated AT1 And optionally if the provided user authentication data matches the reference user authentication data, the (received) encrypted challenge by using the unlocked pK1. To check that the received AT is the generated AT1, the dongle 12 may firstly decrypt both the received AT and the AT1 using the associated symmetric key and checks that the resulting hash (associated with the received AT) is the resulting H1 (associated with the generated AT). The dongle 12 obtains, as a decryption result, the challenge in plain text, i.e. in an unencrypted manner.

The dongle 12 is arranged to send to the server side, i.e. to the first server 16, either directly or indirectly, through e.g., the second server 18, the resulting challenge.

For a generation of a DID relating to the dongle 12, the dongle 12 is preferably configured to get from a ledger 112, like e.g., a BlockChain (or BC), on behalf of the user 1, a specific DID1 that relates to the dongle 12 while providing a PK1. The PK1 is associated with the pK1 and a pre-generated hash, denoted by H1, such as e.g., a RND, that are both stored securely by the dongle 12. To generate the DID1, the ledger uses the received PK1 and an address, denoted by URI2, relating to the second server 18 to be used preferably as a proxy server to the dongle 12. To generate the DID1, the ledger may use a Public Key, denoted by PKL, related to the ledger to encrypt the DID1, such that only the ledger is able to decrypt the thus encrypted DID1 by using a private Key, denoted by pKL, related to the ledger that is associated with the PKL. The ledger is thus able to verify the DID1, i.e. to check whether the DID1 is or is not valid, i.e. whether the DID1 has not or has been modified respectively. The ledger and the dongle 12 may exchange with each other to select the second server 18. The URI2 is related to the second server 18 and the H1. The URI2 allows addressing a memory that is used for exchanging between the first server 16 that writes into such a memory at least the encrypted challenge and the AT1 (and possibly the provided user authentication data) and the dongle 12 that reads from such a memory at least the encrypted challenge and the AT1 (and possibly the provided user authentication data). The URI2 is unique per AT1. Thus, the dongle 12 can not be tracked and the dongle 12 privacy is therefore ensured. Once the ledger has generated the DID1, a ledger server that has an address, denoted by @DID1, relating to the DID1, registers, i.e. stores, the DID1 that is verifiable.

After having been paired with the second device, such as e.g., the phone 14, the dongle 12 is arranged to send to the phone 14 the AT1 and optionally the @DID1.

Instead of a phone, the second device may include a PC, a tablet, a desktop computer, a laptop computer, a mediaplayer, a game console, a tablet, a netbook, a smart jewel (or jewelry), a handset and/or a Personal Digital Assistance (or PDA). The second device may incorporate or cooperate with a baseband (radio) processor(s) or a NAP, so as to access the server side.

The phone 14 includes one or several (micro)processors (and/or a (micro)controller(s)) (not represented), as data processing means, comprising and/or being connected to one or several memories, as data storing means, comprising and/or being connected to means for interfacing with the concerned user 1, such as a Man Machine Interface (or MMI), and comprising and/or being connected to an I/O interface(s) (not represented) that are internally all connected, through an internal bidirectional data bus.

The phone MMI may include a display screen(s) 142 and/or a keyboard(s) 144.

Alternately, instead of two separate elements, the phone MMI includes a touch sensitive display screen that integrates a virtual keyboard (not represented).

The phone MMI allows the user 1 to interact with the phone 14 and in particular with an invention application supported by the phone 14.

The phone 14 may be equipped with or connected to one or several biometric print readers (not represented), so as to capture one or several finger prints, one or several iris prints, one or several face prints and/or other biometric data, as user authentication data.

The I/O interface(s) may be connected to an antenna(s) 146 for wirelessly exchanging data with outside.

The phone 14 includes preferably or is connected to CTL communication means for exchanging data with outside, like e.g., preferably through a first RF link(s) 17, with the dongle 12 and/or possibly, via a Wi-Fi Hotspot (not represented), as a NAP, with the server side, namely at least the first server 16.

Alternatively, i.e. instead of a CTL link(s), or additionally, the phone 14 is connected, through a contact(s), like e.g., a USB type interface, to the dongle 12.

The phone antenna(s) 146 allow(s) the phone 14 to communicate, preferably through a second RF link(s) 19, as a wireless link(s), via a network(s) 110, data with the server side.

The second RF may be fixed at several hundreds of MHz, e.g., around 850, 900, 1800, 1900 and/or 2100 MHz, as a Long Range (or LR) type RF(s).

The network(s) 110 may include a mobile radio-communication network(s). Additionally or alternatively, the network(s) include(s) a WLAN (acronym for "Wireless Local Area Network"), an Internet and/or Intranet type network(s). The network(s) may be accessed, from the phone 14, through an SR RF link(s).

Alternatively, i.e. instead of a wireless and/or CTL link(s), or additionally, the phone 14 is connected, through a wire(s) or a cable(s) (not represented), to the server side.

The phone memory(ies) may include one or several volatile memories and one or several non-volatile memories.

The phone memory(ies) may store a first and/or a last name(s) relating to the user 1, as a user ID(s), an International Mobile Equipment Identity (or NEI), a Mobile Subscriber Integrated Services Digital Network number (or MSISDN), an Internet Protocol (or IP) address, an IMSI, an email address(es) and/or the like, as a phone 14 ID(s).

Alternately, instead of the phone 14, a chip that is connected or communicatively coupled to the phone 14 stores at least a part of the user ID(s) and/or at least a part of the phone ID(s).

The phone 14 (or the cooperating chip) memory(ies) may store a URL and/or a URI, as a first server 16 ID(s). The first server 16 ID(s) allow(s) identifying uniquely and addressing the first server 16. The first server 16 ID(s) may include an IP address, a URL and/or a URI relating to the first server 16.

The phone memory(ies) stores an OS and the invention application.

The phone memory(ies) may store one or several embedded applications. As embedded application(s), there is preferably a Web browser, as User Interface (or UI), so as to let interact a phone user with a server(s), like e.g., a registered first server 16.

The invention application allows storing the received AT1.

The invention application may allow to request, through the phone MMI, from the user 1, user authentication data that is entered and/or submitted by the user 1, as provided user authentication data.

The invention application may allow to request, through the phone MMI, from the user 1, or to receive, from the dongle 12, the @DID1.

The invention application allows retrieving and sending to the first server 16 the stored AT1, the retrieved @DID1 (or a reference to @DID1) and optionally the provided user authentication data.

The first server 16 may be identified by an ID(s) relating to the first server 16 that either the phone user 1 has entered or selected through the phone MMI or the phone 14 has registered and automatically retrieved.

The first server 16 is connected, over the second RF link 19, through the network(s) 110, to the phone 14 that plays a role of a client device.

According to another embodiment (not represented), instead of a single server, two or more servers are involved to carry out notably an authentication operation that is carried out by the first server 16.

The first server 16 runs an application(s) for delivering one or several services.

The first server 16 may be operated by a service provider or on its behalf.

The first server 16 is identified by a URI1, a URL1, an IP address 1 and/or the like, as a first server 16 ID(s).

The first server 16 may be operated by a Mobile Network Operator (or MNO), a Mobile Virtual Network Operator (or MVNO), a bank operator, a service provider or on its behalf.

The first server 16 may be accessible, Over-The-Air (or OTA), Over-The-Internet (or OTI) and/or Over The Cloud (or OTC), over the network(s) 110, from one or several client devices that support, each, an application to authenticate the dongle 12, as pK1 holder.

The first server 16 is hosted by a computer including a processor(s) (not represented), as data processing means, data storing means and one or several I/O interfaces for exchanging data with outside.

The first server 16 is connected to a ledger 112 that is included in or connected to the network(s) 110.

The first server 16 is used for authenticating that its interlocutor owns a private key.

The first server 16 is configured to receive, through a first channel, a request for authenticating an owner of a private key. Such a private key owner authentication request may originate, through a (registered) second device (such as e.g., the phone 14), from a first device (such as e.g., the dongle 12).

The private key owner authentication request includes or is accompanied with an @DID1, an AT1 and optionally provided user authentication data.

The first channel may include a HyperText Transfer Protocol (Secure) (or HTTP(S)) type channel.

The first server 16 is adapted to send, to a ledger 112, a request for getting DID1 along with the @DID1.

The first server 16 is arranged to receive, as a request response, from the ledger 112, the DID1.

The DID1 includes the PK1.

The DID1 allows retrieving an address or an ID relating to the second server 18 and identifying a second server 18 to be addressed.

Alternately, the first server 16 may access a database (not represented) that includes the second server 18 address or get from the second device 14 the second server 18 address.

The first server 16 is configured to generate and store a challenge, such as e.g., a RND for the pending authentication session.

Once the challenge is generated, the first server 16 is adapted to encrypt the challenge by using the PK1.

The first server 16 is configured to send to the second server 18 the AT1, the encrypted challenge and optionally the provided user authentication data.

The first server 16 is arranged to receive from either the second server 18 or the first device, such as e.g., the dongle 12, the challenge.

The first server 16 is adapted to verify whether the received challenge is or is not the generated challenge.

If the received challenge is not the generated challenge, then the first server 16 fails to authenticate its interlocutor, i.e. attests that the DID1 does not include data that belongs to a user or an entity. In other words, the first server 16 interlocutor is not the one that possesses the pK that is associated with the received PK that has been used to encrypt the sent challenge.

Otherwise, i.e. if the received challenge is the generated challenge, the first server 16 succeeds in authenticating its interlocutor, i.e. attests that the DID1 includes data that belongs to a user or an entity. In other words, the first server 16 interlocutor is the one that possesses the pK that is associated with the received PK that has been used to encrypt the sent challenge.

The first server 16 is able to authenticate or not its interlocutor prior to granting or not the first server interlocutor access to one or several services offered by or through the first server 16.

To access the first server 16, the user 1 (or the entity) does not need to reveal any personal user data that originates from either the dongle 12 or the paired second device, like e.g., the phone 14.

The second server 18 is connected, over a third RF link 15, through the network(s) 110 and the PC 13, to the first device, such as e.g., the dongle 12 that plays a role of a client device for the second server 18.

The second server 18 is identified by a URI2, a URL2, an IP address 2 and/or the like, as a second server 18 ID(s) or address.

The second server 18 may be operated by a MNO, a MVNO, a bank operator, a service provider or on its behalf.

The second server 18 may be accessible, OTA, OTI and/or OTC, over the network(s) 110, from one or several client devices that support, each, an application to authenticate the dongle 12, as pK1 holder.

The second server 18 is hosted by a computer including a processor(s) (not represented), as data processing means, data storing means and one or several I/O interfaces for exchanging data with outside.

The second server 18 is configured to receive, through a second channel, from the first server 16, a request for authenticating an owner of a private key. Such a private key owner authentication request may originate, through a second device (such as e.g., the phone 14), from a first device (such as e.g., the dongle 12).

The private key owner authentication request includes or is accompanied with an encrypted challenge, an AT1 and optionally provided user authentication data.

The second channel may include an HTTP(S) type channel.

The second server 18 plays a role of a proxy (entity) with respect to a plurality of first devices including at least the dongle 12, as a first device.

Each first device that has the second server 18, as a proxy entity, polls regularly, e.g., with a predetermined time period such as every ten seconds, the second server 18 by sending the H1, so as to know whether the second server 18 has received data that is intended to the concerned first device. To be able to identify whether the second server 18 has or has not received data intended to the first device that is polling the second server 18, the second server 18 has to retrieve whether the second server 18 has or has not registered received data that is associated with the H1 received from both the first server 16 and the first device. Only if the second server 18 has registered received data that is associated with the H1 received from both the first server 16 and the first device, the second server 18 knows that the received polling request has to be responded by sending back to the concerned first device the associated received data, as the AT1, the encrypted challenge and optionally the provided user authentication data.

The dongle 12 may perform a so-termed long polling to the second server 18 that only replies to a long polling request when the second server 18 has data to be sent to the dongle 12.

The second server 18 is configured to send, to the first device, such as e.g., the dongle 12, the (received) AT1, the (received) encrypted challenge and optionally the provided user authentication data.

The second server 18 is adapted to forward to the first device, such as e.g., the dongle 12, any message that is intended to the dongle 12.

Figure 2:
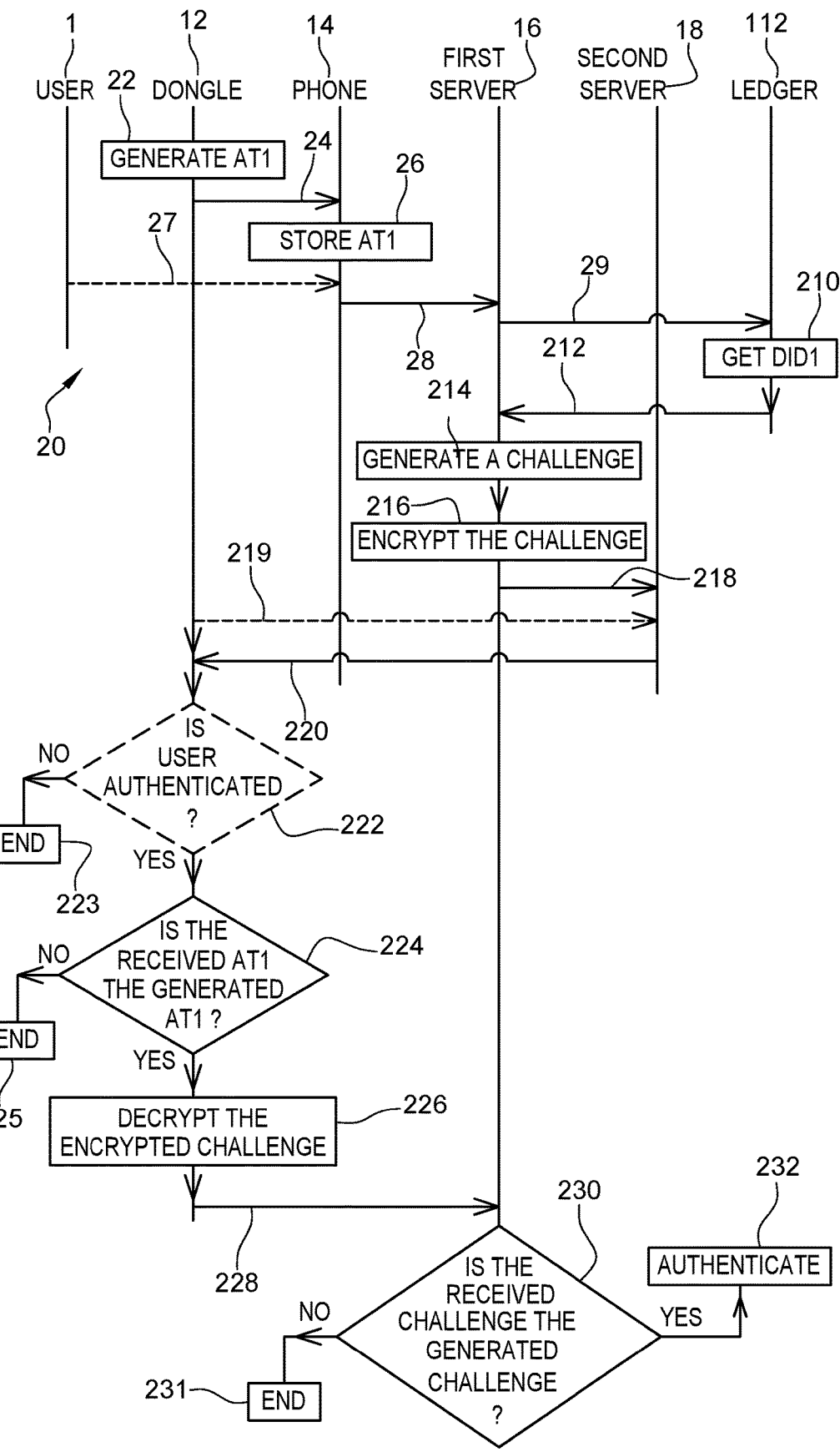
FIG. 2 represents one embodiment of one message flow between notably the dongle, the phone, the first server, as issuer and verifier of a challenge, and the second server of FIG. 1, so as to authenticate or not the dongle, as a private key holder, to access securely a service(s) provided by or through the first server.

FIG. 2 depicts an exemplary embodiment of the method 20 for accessing a private key that involves the dongle 12, the phone 14, the first server 16 and the second server 18, so that the first server 16 authenticates or not the dongle 12, as a private key holder, based on an AT1 issued by the dongle 12, a challenge issued and encrypted by the first server 16 with the dongle PK and a H1 associated, through the second server 18, with the dongle 12.

It is assumed that the dongle 12 is out-of-band paired with, on the one hand, the phone 14, as a first paired local device, and, on the other hand, the PC 13, as a second paired local device.

It is also assumed that the dongle 12 is connected, through the phone 14, to the server side and exchanges, through the PC 13, with the server side.

Firstly, the dongle 12 stores a pK1 and the associated PK1, as a key pair (not represented).

The dongle 12 stores, in association with the key pair, a pre-generated H1 (not represented).

The dongle 12 generates 22 an AT1. To generate the AT1, the dongle 12 may use the H1 that is concatenated with the H1 that is preferably encrypted by using the Ked, as a symmetric key. The dongle 12 may also associate the H1 with a predefined time stamp, a predefined validity time period, a predefined second device ID, such as e.g., an IMSI, and/or reference user authentication data that is also, each, encrypted by using the Ked. The AT1 may depend on a second device ID that identifies the second device that is used by the user (or the entity) to control access to the concerned pK1.

The dongle 12 stores, in association, the pK1, the H1, the AT1 and optionally an @DID1 (not represented).

Preferably during a pairing between the dongle 12 and the phone 14, the dongle 12 sends 24 to the phone 14 the AT1 and optionally the @DID1. The user 1, the dongle 12 and the phone 14 are at one and the same (geographical) location, such as a user home place or a user enterprise premise.

Once the pairing between the dongle 12 and the phone 14 has been carried out, the user 1 may move away, with the phone 14, from the dongle 12 location. The phone 14 location may be separate from the dongle 12 location, after the pairing between the dongle 12 and the phone 14, when applicable (i.e. when the pairing between the dongle 12 and the phone 14 occurs).

The phone 14 stores 26 preferably, in a secure enclave, the (received) AT1 and optionally the (received) @DID1.

The user 1 may provide 27, preferably upon the phone request, the phone 14 with user authentication data.

The phone 14 sends 28 to the first server 16 the AT1, the @DID1 and optionally the provided user authentication data. The @DID1 is previously either retrieved by the phone 14 or provided by the user 1 through the phone MMI.

Alternately, i.e. instead of sending by the phone 14 directly to the first server 16, the phone 14 sends indirectly, namely through the second server 18, to the first server 16, the AT1, the @DID1 and optionally the provided user authentication data, so as to enhance the privacy with respect to the phone 14, as the used second device.

The phone 14 may send 28 to the first server 16, besides the AT1, the @DID1 and optionally the provided user authentication data, the second server 18 address.

The first server 16 stores (not represented) the received AT1 and optionally the provided user authentication data.

The first server 16 sends 29, to the ledger 112, a request for getting a DID along with the received @DID1.

The ledger 112 gets 210, based on the @DID1, the concerned DID1. The ledger 112 verifies that the DID1 has not been modified, i.e. the DID1 is valid.

Only if the DID1 is valid, the ledger 112 sends 212, to the first server 16, the retrieved DID1. The DID1 includes the PK1, optionally the H1 and optionally the second server 18 address.

The first server 16 generates 214 a challenge, such as e.g., a RND1.

The first server 16 encrypts 216 the (generated) challenge by using the PK1. The PK1 is previously retrieved or extracted by the first server 16 by using the DID1.

Once the first server 16 has encrypted the challenge, the first server 16 sends 218, to the second server 18, the received AT1, the encrypted challenge, optionally the H1 and optionally the provided user authentication data. The second server 18 address may be previously retrieved or extracted by the first server 16 by using the DID1 or received from the phone 14. The H1 is previously retrieved or extracted by the first server 16 by using the DID1.

The second server 18 stores or registers (not represented), in association, the (received) AT1, the (received) encrypted challenge, optionally the (received) H1 and optionally the (received) provided user authentication data.

The second server 18 may be able to verify, based on an H1 received from the dongle 12, whether the second server 18 has or has not received data intended to the dongle 12. To verify whether the second server 18 has or has not received data intended to the dongle 12, the second server 18 is able to retrieve from the received AT1, the used H1 and, only if the H1 received from the dongle 12 matches either the H1 retrieved from the (received) AT1 or, when present, the H1 received from the first server 16, the second server 18 knows that the stored data in association with the H1, namely the AT1, the encrypted challenge, optionally the H1 and optionally the provided user authentication data is intended to the dongle 12.

The dongle 12 polls, i.e. sends 219 (preferably regularly) one or several requests for getting data, the second server 18 to know whether the second server 18 has or has not received data intended to the dongle 12 by sending to the second server 18 the H1.

The second server 18 gets (not represented) data that is registered in association with the H1, namely the (received) AT1, the (received) encrypted challenge and optionally the (received) provided user authentication data.

The second server 18 sends 220 to the dongle 12 the AT1, the encrypted challenge and optionally the provided user authentication data.

The dongle 12 verifies 222 preferably whether the user 1 is or is not authenticated.

To authenticate or not the user 1, after having optionally decrypted the reference user authentication data comprised in the AT1 by using the Ked, as the symmetric key, the dongle 12 verifies whether the provided user authentication data does or does not match the reference user authentication data.

If the provided user authentication data does not match the reference user authentication data, then the dongle 12 terminates 223 the launched authentication process.

Otherwise, i.e. if the provided user authentication data matches the reference user authentication data, the dongle 12 continues the launched authentication process.

The dongle 12 is the authenticator of the user 1.

The dongle 12 verifies 224 whether the received AT1 is or is not the generated AT1, i.e. whether the received AT1 is or is not valid, namely whether data, such as a time stamp or a validity time period, associated with the AT1 is or is not valid.

To verify whether the received AT1 is or is not the generated AT1, i.e. whether the received AT1 is or is not valid, the dongle 12 uses preferably the Ked, as the symmetric key, to decrypt the received AT1 and the generated AT1. Thus, the dongle 12 is able to compare the received H1 and the generated H1, and possibly the corresponding associated data, namely the received time stamp and the defined time stamp, the received validity time period and the defined validity time period, the received second device ID and the defined second device ID and/or the received reference user authentication data and the defined reference user authentication data respectively.

If the received AT1 is not the generated AT1 and/or, when applicable, the received AT1 has been received after the predefined time limit, namely too late, i.e. if the received AT1 is not valid, then the dongle 12 terminates 225 the launched authentication process.

Otherwise, i.e. if the received AT1 is the generated AT1 and, when applicable, if the received AT1 has been received on or before the predefined time limit, namely on time, i.e. if the received AT1 is valid, the dongle 12 continues the launched authentication process by decrypting 226 the (received) encrypted challenge.

To decrypt the encrypted challenge, the dongle 12 uses the pK1 and obtains the challenge in plain text, i.e. in an unencrypted manner.

Once the dongle 12 has obtained the challenge, the dongle 12 sends 228, to the first server 16, the challenge.

Alternately, i.e. instead of sending by the dongle 12 directly to the first server 16, the dongle 12 sends indirectly, namely through the second server 18, to the first server 16, the challenge, so as to enhance the privacy with respect to the dongle 12, as the used first device. Thus, the first server 16 does not know the dongle 12.

The first server 16 verifies 230 whether the received challenge is or is not the generated challenge, i.e. whether the received challenge is or is not valid.

If the received challenge is not the generated challenge, i.e. if the received challenge is not valid, then the first server 16 terminates 231 the launched authentication process.

Otherwise, i.e. if the received challenge is the generated challenge, i.e. if the received challenge is valid, the first server 16 attests 232 that the DID includes data that belongs to a user (or an entity). The validity of the received challenge proves that the dongle 12 owns the pK1.

The phone 14 has thus the right to use the private key that resides in the dongle 12 while transmitting only the AT1 which is less sensitive than using instead a private key that is stored in the phone 14, i.e. in an untrusted environment.

Thus, the phone 14 does not need to store any private key while being able to authenticate to the first server 16 to access a service(s) offered by or through the first server 16.

The embodiments that have just been described are not intended to limit the scope of the concerned invention. Other embodiments may be given. As another embodiment, instead of exchanging with two servers, the first device and the second device exchange both only with the second server, as a proxy to and from the client side.

The invention claimed is:

1. A method for accessing a private key, comprising: —a) storing, by a first device ,the private key and public key associated therewith; —b) generating , by the first device, an access token thereby producing a generated access token; —c) sending , by the first device, to a second device ,the access token; —d) sending , by the second device, to a first server , an address relating to a decentralized identifier and the access token; —e) sending , by the first server, to a ledger, a request for getting a decentralized identifier along with the decentralized identifier address; —f) sending , by the ledger, to the first server, the decentralized identifier, the decentralized identifier including the public key; —g) generating , by the first server, a challenge thereby producing a generated challenge; —h) encrypting, by the first server, the challenge using the public key thereby producing an encrypted challenge —i) sending , by the first server, through a second server , to the first device, the encrypted challenge and the access token, an address relating to the second server being identified by using the decentralized identifier; —j) verifying , by the first device, whether the access token is the generated access token received or not; —k) decrypting , by the first device, only if the access token received is the generated access token, the encrypted challenge using the private key; —i) sending , by the first device, directly or through the second server, to the first server, the challenge; —m) verifying , by the first server, whether the received challenge is the generated challenge or not, and —n) attesting , by the first server, only if the received challenge is the generated challenge, that the decentralized identifier includes data that belongs to a user or an entity.

2. Method according to claim 1, wherein, the access token depending on predetermined reference user authentication data, in addition to sending, by the second device, to the first server, the decentralized identifier address and the access token, the second device sends, to the first server, user authentication data provided by the user through the second device, in addition to sending, by the first server, to the second server, the encrypted challenge and the access token, the second device sends, to the first server, the provided user authentication data, in addition to sending, by the second server, to the first device, the encrypted challenge and the access token, the second server sends, to the first device, the provided user authentication data, and, in addition to verifying whether the received access token is or is not the generated access token, the first device verifies (222) whether the provided user authentication data does or does not match the predetermined reference user authentication data, and the first device decrypts, only if the provided user authentication data matches the reference user authentication data, the encrypted challenge using the private key.

3. Method according to claim 1, wherein, instead of sending, by the second device, directly to the first server, the decentralized identifier address and the access token, the second device sends, through the second server, to the first server, the decentralized identifier address and the access token.

4. Method according to claim 1, wherein, instead of sending, by the first device, directly to the first server, the challenge, the first device sends, through the second server, to the first server, the challenge.

5. Method according to claim 1, wherein the access token depends on an identifier relating to the second device, the second device identifier identifying the second device that is used by the user or the entity to control access to the private key.

6. Method according to claim 1, wherein, in addition to sending, by the second device, to the first server, the decentralized identifier address and the access token, the second device sends, to the first server, an address relating to the second server.

7. A system comprising a first server for accessing a private key, wherein the first server is configured to: —receive, from a second device , an address relating to a decentralized identifier and an access token; —send, to a ledger , a request for getting a decentralized identifier along with the decentralized identifier address; - receive, from the ledger, the decentralized identifier, the decentralized identifier including public key; —generate a challenge thereby producing a generated challenge; —encrypt the challenge using the public key ; —send, through a second server , to a first device—, the encrypted challenge and the access token, an address relating to the second server being identified by using the decentralized identifier; —receive, from the first device, the challenge thereby producing a received challenge; verify whether the received challenge is the generated challenge or not; and —attest, only if the received challenge is the generated challenge, that the decentralized identifier includes data that belongs to a user or an entity.

8. The system of claim 7 further comprising a second server for accessing a private key, wherein the second server is configured to:

receive, from the first server, the encrypted challenge and the access token; and send, to the first device, the encrypted challenge and the access token.

9. A system for accessing a private key, the system including a first device, a second device, a first server and a second server wherein the first device is configured to: —store the private key and public key therewith associated; —generate an access token thereby producing a generated access token; and —send, to the second device, the access token; wherein the second device is configured to send, to the first server, an address relating to a decentralized identifier and the access token; wherein the first server is configured to send, to a ledger, a request for getting a decentralized identifier along with the decentralized identifier address; wherein the ledger is configured to send, to the first server, the decentralized identifier, the decentralized identifier including the public key; wherein the first server is configured to: —generate a challenge thereby producing a generated challenge; —encrypt the challenge using the public key thereby producing an encrypted challenge; and —send, through the second server, to the first device, the encrypted challenge and the access token, an address relating to the second server being identified by using the decentralized identifier; wherein the first device is configured to: verify whether the access token received is the generated access token or not; —decrypt, only if the access token received is the generated access token, the encrypted challenge using the private key; an —send, directly or through the second server, to the first server, the challenge; and wherein the first server is configured to: verify whether the received challenge is the generated challenge or not; and —attest, only if the received challenge is the generated challenge, that the decentralized identifier includes data that belongs to a user or an entity.

* * * * *